United States Patent
Cortes et al.

(10) Patent No.: US 12,340,550 B2
(45) Date of Patent: Jun. 24, 2025

(54) TECHNIQUES FOR UNSUPERVISED ANOMALY CLASSIFICATION USING AN ARTIFICIAL INTELLIGENCE MODEL

(71) Applicant: Mindtrace.ai USA, Inc., Coto De Caza, CA (US)

(72) Inventors: Camilo Jose Vargas Cortes, Manchester (GB); Can Elbirlik, Istanbul (TR)

(73) Assignee: Mindtrace.ai USA, Inc., Coto de Caza, CA (US)

( * ) Notice: Subject to any disclaimer, the term of this patent is extended or adjusted under 35 U.S.C. 154(b) by 342 days.

(21) Appl. No.: 17/974,495

(22) Filed: Oct. 26, 2022

(65) Prior Publication Data
US 2024/0144635 A1    May 2, 2024

(51) Int. Cl.
G06V 10/26    (2022.01)
G06V 10/774   (2022.01)
G06N 20/20    (2019.01)

(52) U.S. Cl.
CPC ........ *G06V 10/267* (2022.01); *G06V 10/7753* (2022.01); *G06N 20/20* (2019.01); *G06V 2201/07* (2022.01)

(58) Field of Classification Search
CPC ............. G06V 10/267; G06V 10/7753; G06V 2201/07; G06N 20/20
See application file for complete search history.

(56) References Cited

U.S. PATENT DOCUMENTS

2021/0035305 A1    2/2021    Fang et al.
2021/0279872 A1*   9/2021    Lynch .................... G06N 5/022

FOREIGN PATENT DOCUMENTS

CN    113947807    1/2022
CN    114519693    5/2022
WO    2022-192432  9/2022

OTHER PUBLICATIONS

Hayes et al, "Contextual anomaly detection framework for big sensor data," 2015, Journal of Big Data 2:2 (22 pages) (Year: 2015).*
Chaoqin Huang et al., 'Self-Supervised Masking for Unsupervised Anomaly Detection and Localization', arXiv:2205.06568, May 2022.
Korean Intellectual Property Office, Written Opinion of the International Searching Authority for PCT/US2023/077154, pp. 1-4, Feb. 13, 2024.

* cited by examiner

*Primary Examiner* — David F Dunphy
(74) *Attorney, Agent, or Firm* — InventIQ Legal LLP; Steven J. Cahill (57) ABSTRACT

A method for operating a computing system on at least one processor includes performing search space reduction on input data using a first trained artificial intelligence model to generate relevant regions in the input data. The method also includes generating region proposals in the relevant regions using a second trained artificial intelligence model. The method further includes performing unsupervised anomaly classification on the region proposals using a third trained artificial intelligence model to classify each of the region proposals as normal or as an anomaly. The method further includes performing contextual filtering on the region proposals classified as anomalies to determine if any of the region proposals classified as anomalies are contextually normal using a fourth trained artificial intelligence model.

16 Claims, 6 Drawing Sheets

TECHNIQUES FOR UNSUPERVISED ANOMALY CLASSIFICATION USING AN ARTIFICIAL INTELLIGENCE MODEL

FIELD OF THE DISCLOSURE

The present disclosure relates to computing systems, and more particularly, to techniques for unsupervised anomaly classification using an artificial intelligence model.

BACKGROUND

An artificial neural network (ANN) is a collection of connected nodes that is implemented by a computer system. An ANN loosely models the neurons in a biological brain. A node in an ANN receives and processes an input signal from one or more nodes and transmits an output signal to other nodes in the network. The input signal at each node represents a real number, and the output of each node is computed as a function of the sum of the input signals to the node. The connections between nodes are referred to as edges. Edges are typically associated with weights that adjust as learning proceeds. A weight increases or decreases the strength of the signal at a connection. Each of the nodes may have a threshold such that the node only generates an output signal if the computed output of the node crosses the threshold. Typically, the nodes in an ANN are organized into layers. Each of the layers may perform a different function on its input signals. Signals travel through the layers to the output of the ANN.

A convolutional neural network (CNN) is a class of artificial neural networks, commonly applied to analyze visual imagery. A CNN may include an input layer, hidden layers, and an output layer. In a convolutional neural network, the hidden layers include layers that perform convolutions. Typically, a CNN includes a layer that performs a dot product of the convolution kernel with the layer's input matrix. As the convolution kernel slides along the input matrix for the layer, the convolution operation generates a feature map, which in turn contributes to the input of the next layer. This layer is followed by other layers such as pooling layers, fully connected layers, and normalization layers.

Transformers are another type of neural network architecture that was initially proposed for natural language processing (NLP) and that has been adapted as vision transformers (ViT) to approach visual tasks. Transformers measure the relationships between pairs of input tokens (e.g., words in the case of text strings) that are termed attention. The computational cost of transformers grows exponentially with the number of tokens. For images, the basic unit of analysis is the pixel. However, computing relationships for every pixel pair in a typical image is prohibitive in terms of memory and computation resources. Instead, ViT computes relationships among pixels in various small sections of an image (e.g., 16×16 pixels), at a drastically reduced cost. Transformers have been successfully applied in computer vision for image classification and object detection tasks.

The image classification task, also known as object recognition, is a classical problem in computer vision. An image classification method or model takes an image as an input and outputs a category or label according to the input image visual content. The term model as used herein may, for example, refer to an algorithm, such as an artificial neural network performed by a computing system. Previously known solutions to this task commonly use CNNs to generate and classify the features that represent the image. In contrast to object detection, image classification approaches do not output any information related to the localization of the object of interest within the images.

The object detection task aims to define boundaries, referred to as bounding boxes, for all of the objects of interest contained in an input image. Domains of object detection include face detection and pedestrian detection. Object detection methods can be divided into two categories: one-stage and two-stage object detection approaches. One-stage object detection approaches address the problem by generating output bounding boxes and object classification probabilities in a single pass of the input image through the models. In contrast, two-stage object detection approaches first generate potential regions of interest referred to as region proposals (as bounding boxes) and afterwards assign the classification label to each bounding box. Object detection methods do not discriminate the objects of interest at the pixel level, i.e., output bounding boxes might contain background pixels or pixels that belong to a different category.

Semantic image segmentation is a computer vision task in which a computer labels specific regions of an image according to the visual content of the image. More specifically, the goal of semantic image segmentation is to label each pixel of an image with a corresponding class of what is being represented. Semantic image segmentation differs from object detection, in that semantic image segmentation does not predict any bounding boxes around objects and does not differentiate between different instances of the same object.

The aforementioned computer vision tasks have been addressed via supervised learning. Supervised learning is the machine learning task of learning a function that maps an input to an output based on examples of input-output pairs. The target function is inferred from training data consisting of a set of training examples. Each example is a pair consisting of an input image and a desired output value. Ideally, the training process allows the model or algorithm to generalize appropriately, determining the class labels for unseen instances. When applied in real world use cases, supervised learning has an inherent cost associated with the capturing and labeling of the training data.

On the other hand, unsupervised learning algorithms are not provided with any pre-assigned labels or scores for the training data. As a result, unsupervised learning algorithms must first self-discover any naturally occurring patterns in the training data set. In contrast to supervised learning, unsupervised learning does not require human labor to prepare the training datasets, or to assign and verify tags. Consequently, unsupervised techniques traditionally require a greater amount of training data and converge more slowly.

In machine learning, anomalies are defined as events that deviate from the standard. Anomalies in images can be explained by either their appearance, frequency, or prior human knowledge. Unsupervised anomaly detection techniques detect anomalies in an unlabeled test dataset under the assumption that most of the instances in the dataset are normal.

In computer vision, the unsupervised anomaly detection task focuses on automatically generating bounding boxes around regions of the input image that are contextually and visually anomalous as in the object detection task. Initially, no categories are assigned to the bounding boxes due to the unsupervised nature of the problem.

DETAILED DESCRIPTION

One of the main challenges with performing unsupervised anomaly detection relates to the complexity of the environment in which the input images are captured. For example, visual differences between background and foreground features of an image may not be obvious. In addition, the definition of foreground objects that belong to the anomaly class might be dependent on prior knowledge that resides outside the image data. Moreover, previously known approaches for object detection are tied to resolution constraints, limiting the input size of the images used. In the absence of tagged data, these problems make anomaly detection solution development a non-trivial task.

According to some embodiments disclosed herein, artificial intelligence (AI) models are provided that receive images (e.g., 2-dimensional images) as input data and that generate bounding boxes pointing at the localization of visually anomalous regions in the images. The AI models include a process pipeline supported by different artificial neural network architectures that use pre-trained and fine-tuned learned features to discriminate regions of interest in the images. The AI models support the use of labeled data for improving processing times (e.g., using search space reduction) and performance (e.g., using contextual filtering). The AI models can detect anomalous regions in images, for example, using region proposals and anomaly classifications. The AI models can also use search space reduction and contextual filtering using prior knowledge to assist in detecting anomalous regions in the images. Each of these steps can be represented in a two-stage split that includes a training and definition stage and an inference stage. The search space reduction and contextual filtering steps are optional steps that may be use-case dependent, because the AI models may need to use either contextual information or labeled data (e.g., from public datasets) for these steps.

In the definition and training stage of the AI models, the approaches and models to be used in each step are defined and trained as needed according to the specific use case. The search space reduction step reduces the size of the input image, constraining the image to a smaller area of interest by using prior knowledge. The search space reduction step can be defined either using contextual information or supervised models. For example, in manufacturing applications, an input image commonly contains irrelevant background information that can be cropped out with traditional image processing techniques. In some embodiments, the search space in an image can be narrowed by training segmentation or detection models to find the extent of the regions of interest in the image using existing labeled data.

Figure 1:
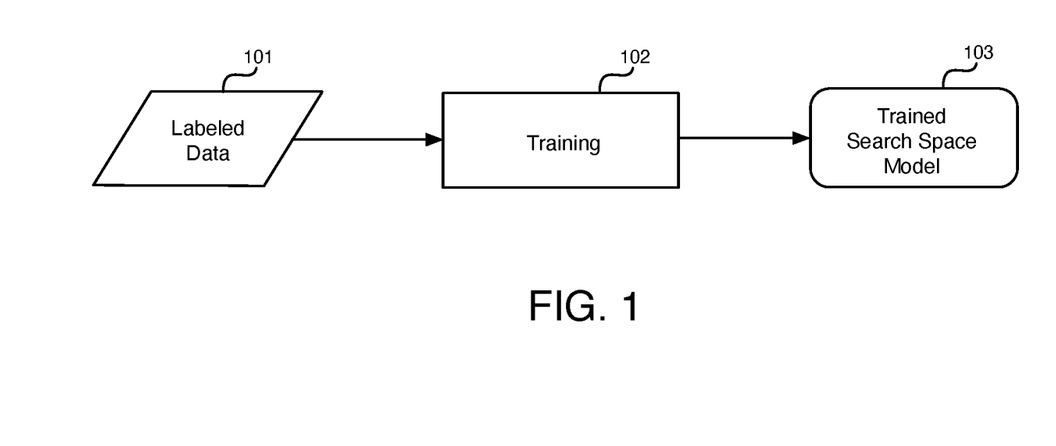
FIG. 1 is a diagram that illustrates an example of an operation that can be performed to implement search space reduction in labeled input data using a supervised model.

FIG. 1 is a diagram that illustrates an example of an operation that can be performed to implement search space reduction in labeled input data using a supervised model. As shown in Figure (FIG. 1, labeled data 101 is provided as an input to a training operation 102. The labeled data 101 may, for example, include one or more labeled images. Labeled data 101 is training data in the same domain of the use case. For the training operation 102, labels around the region of interest must be available. The training operation 102 may, for example, use one or more training segmentation or detection artificial intelligence (AI) models that reduce the search space in the one or more images in the labeled data 101. The training operation 102 may reduce the search space, for example, by locating relevant regions in one or more input images. The training operation 102 generates a trained search space model 103 as an output. As an example, anomaly detection can be performed in operation 102 on aerial imagery provided in the labeled data 101 by applying supervised approaches to reduce the search space of the imagery by detecting infrastructure or landmarks using labels associated with the aerial imagery.

Figure 2:
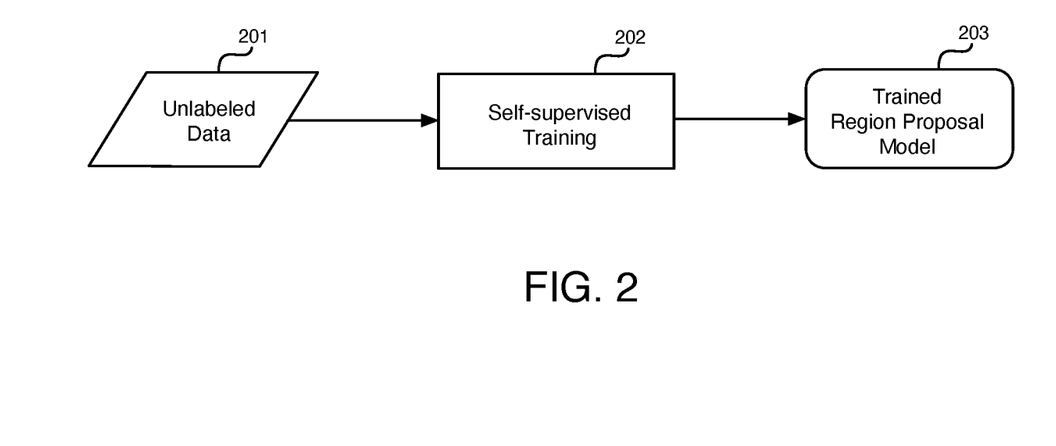
FIG. 2 is a diagram that illustrates an example of an operation that can be performed to implement one or more region proposals in unlabeled input data using self-supervised training.

FIG. 2 is a diagram that illustrates an example of an operation that can be performed to implement one or more region proposals in unlabeled input data using self-supervised training. As shown in FIG. 2, unlabeled data 201 is provided as an input to a self-supervised training operation 202. The unlabeled data 201 can, for example, include one or more unlabeled images. Unlabeled data 201 is training data in a neighbor or general domain of the use case, where data should be available. Self-supervised training operation 202 is performed on an AI model using the unlabeled data 201 to propose a set of regions (i.e., perform region proposal). The self-supervised training operation 202 can, for example, create labels for the unlabeled data 201. The AI model that has been trained using the self-supervised training operation 202 is then output as a trained region proposal model 203. Unsupervised learning techniques can be used to train ANNs without data labels. Self-supervised learning techniques can be used to train ANNs using a mix of data with and without data labels, such that data labels are internally generated by the network during training from unlabeled data.

During the region proposal performed in operation 202, a set of regions (e.g., small regions) in an image are proposed that are subsequently classified as normal or anomalous. The proposed regions can be defined in operation 202 using attention maps that are generated from pretrained features or by using brute force techniques, such as sliding windows or tiling approaches. The attention maps may, for example, correspond to relevant features in the images. The techniques that are used for region proposals in images may be, for example, dependent on a particular use-case, or may be data dependent. For example, in natural images (such as aerial imagery), features from pretrained self-supervised transformer models may highlight regions of interest. When using attention maps, additional self-supervised fine-tuning can be performed in operation 202 during the training stage to improve the perception of the attention maps over the regions of interest.

Figure 3:
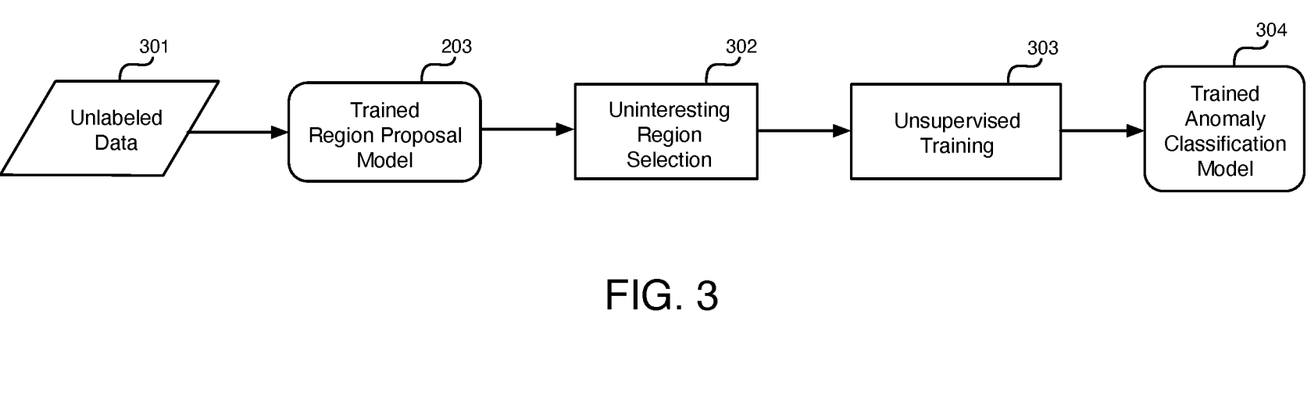
FIG. 3 is a diagram that illustrates examples of operations for performing unsupervised anomaly classification training using the pre-trained region proposal model trained in the operation of FIG. 2 to select uninteresting or healthy samples from unlabeled input data.

FIG. 3 is a diagram that illustrates examples of operations for performing unsupervised anomaly classification training using the pre-trained region proposal model 203 trained in the operation of FIG. 2 to select uninteresting or healthy samples from unlabeled input data. As shown in FIG. 3, unlabeled data 301 is initially provided as an input to the trained region proposal model 203 that was trained using operation 202 of FIG. 2. The unlabeled data 301 may, for example, include one or more unlabeled images. Unlabeled data 301 is the same data as data 101, but there are no labels available for the anomaly detection problem. In FIG. 1, labels might be available for detecting the region of interest used to reduce the search space. The trained region proposal model 203 generates a region proposal using the unlabeled data 301. In operation 302, one or more uninteresting or healthy regions are selected from the region proposal generated by the trained region proposal model 203 using the unlabeled data 301. The one or more uninteresting and/or healthy regions selected in operation 302 are provided as an input to an AI model that implements anomaly classification using unsupervised training in operation 303. In operation 303, the artificial intelligence (AI) model performs anomaly classification on the uninteresting and/or healthy regions during unsupervised training. The AI model that has been trained during the unsupervised training operation 303 is then output as a trained anomaly classification model 304. Operation 302 can only be applied automatically when using pretrained attention mechanisms or image processing techniques for region proposals.

Operation 303 can be performed using unsupervised classification methods, e.g., student-teacher AI models that perform anomaly classification. In a student-teacher AI model, a student AI model attempts to match its output to the output of the teacher AI model. The unsupervised anomaly classification performed in operation 303 may be defined by a binary classifier that assigns a normal or an abnormal label to each evaluated region from the region proposal received from model 203. During the unsupervised training of operation 303, the anomaly classification model learns a visual normal distribution representation of the proposed regions generated by model 203. The embodiment of FIG. 3 does not need to use weak labeling over the data or to expose the model only to healthy data as in traditional anomaly detection approaches. Instead, the unsupervised training performed in operation 303 can either assume that the frequency of anomalies is low, or can select only healthy regions automatically using attention maps or image processing approaches.

Figure 4:
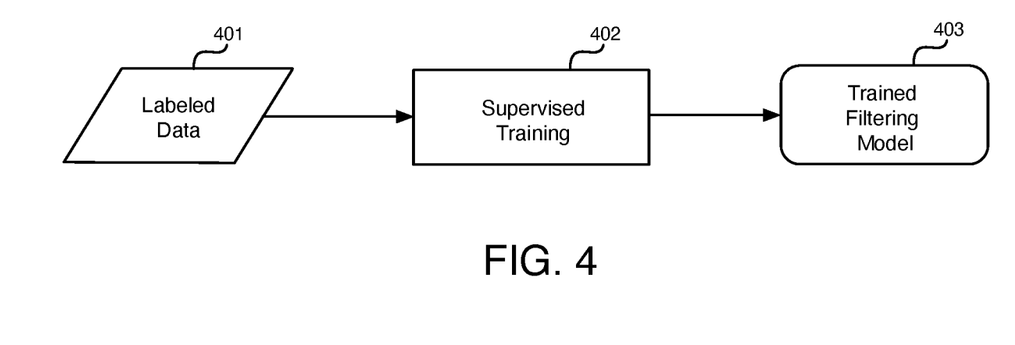
FIG. 4 is a diagram that illustrates an example of an operation that trains the model that is afterwards used for validation at the inference stage by using prior knowledge indicated by labeled data.
Figure 9:
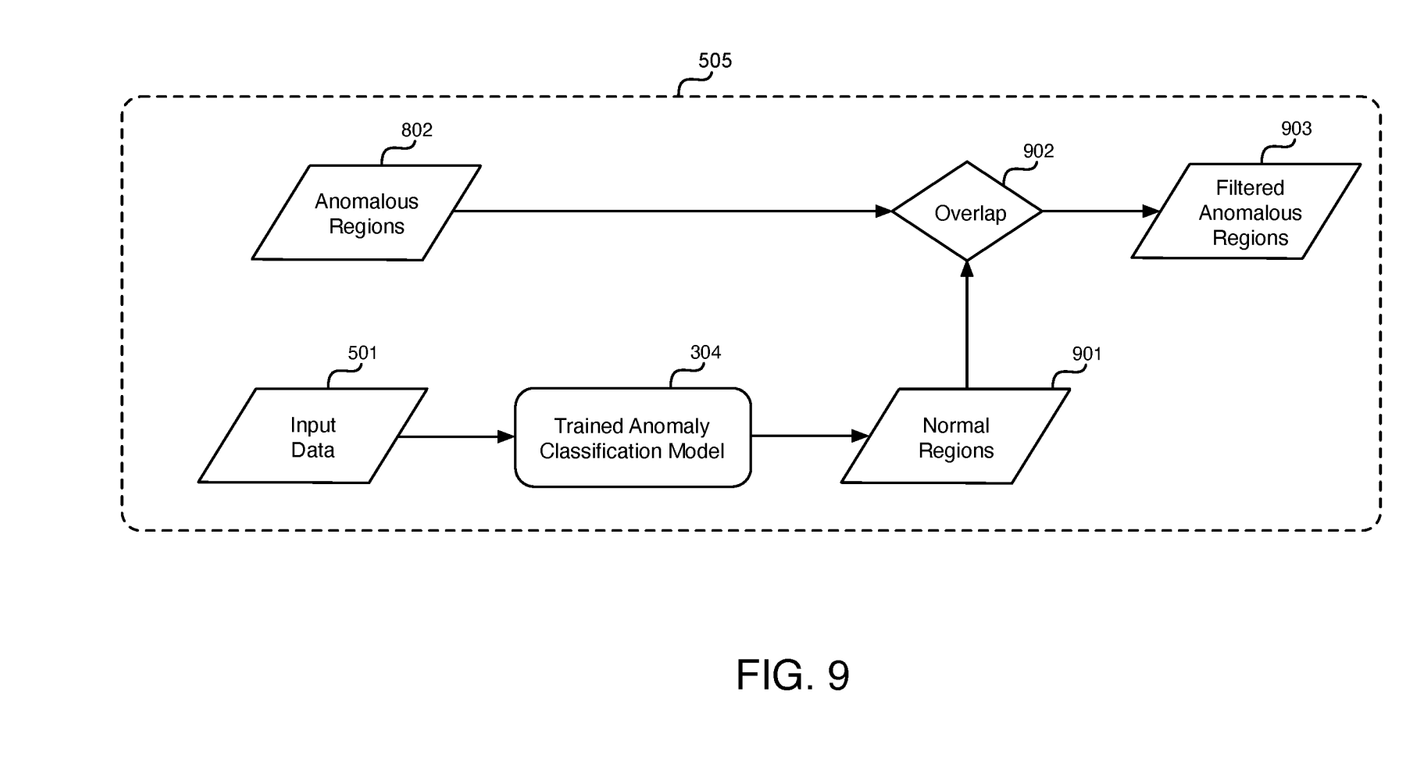
FIG. 9 is a diagram illustrating examples of operations for generating filtered anomalous regions in input data by computing overlaps between normal regions and anomalous regions in the input data.

FIG. 4 is a diagram that illustrates an example of an operation that trains the model that is afterwards used for validation at the inference stage by using prior knowledge indicated by labeled data. Labeled data 401 is the same data as data 101, but with labels available for elements that are to be filtered from the anomaly detection steps (as shown in FIG. 9). As shown in FIG. 4, labeled data 401 is initially provided as an input to an AI model in operation 402 to train the model that is afterwards used for validation at the inference stage. Operation 402 only trains a model that can be, for example, a CNN for object detection on known categories (i.e., the training operation defines the parameters of the model for a specific architecture defined beforehand). The labeled data 401 may, for example, include one or more labeled images. During the supervised training operation 402, a detection or segmentation AI model is trained using supervised training with the labeled data 401. The supervised training operation 402 generates a trained filtering AI model 403 that can detect regions (e.g., in images) that may appear anomalous to the unsupervised classifier, but are contextually normal.

Figure 5:
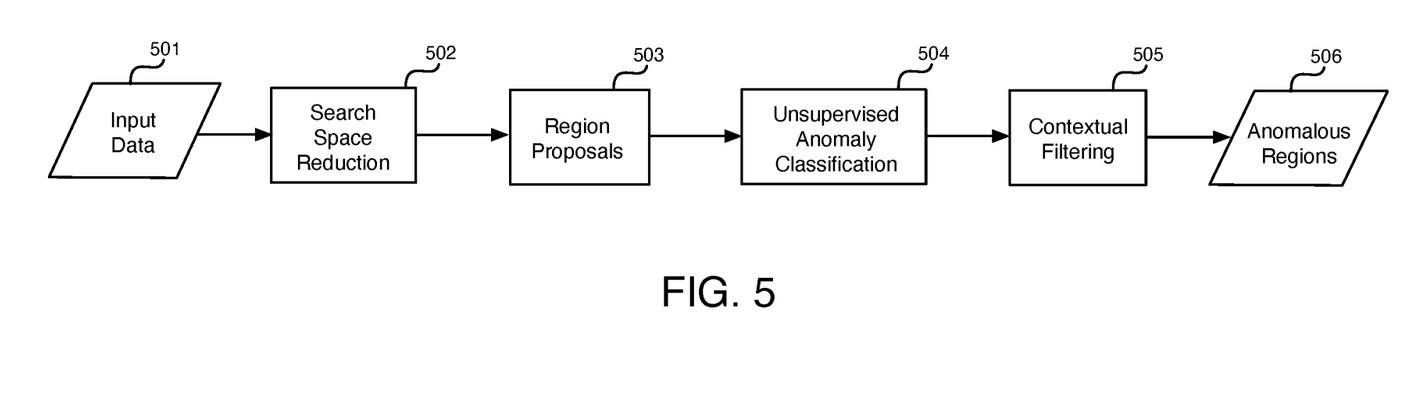
FIG. 5 is a diagram that illustrates examples of operations that can be performed to detect anomalous regions in input data using search space reduction, region proposals, unsupervised anomaly classification, and contextual filtering.

After all of the AI models have been defined and trained as disclosed herein, for example, with respect to FIGS. 1-4, an inference stage applies each step sequentially over the input data to generate the anomaly detection outputs as illustrated, for example, in FIG. 5. FIG. 5 is a diagram that illustrates examples of operations that can be performed to detect anomalous regions in input data using search space reduction, region proposals, unsupervised anomaly classification, and contextual filtering. Input data 501 is testing data similar to data 101, but used to either evaluate the model or generate inference outputs. In operation 502, search space reduction is performed on the input data 501 (e.g., that contains images) using, for example, the trained search space model 103 generated in operation 102 of FIG. 1 to generate relevant regions in the input data 501. The relevant regions identified in operation 502 are provided as inputs to operation 503. In operation 503, the trained region proposal model 203 trained in operation 202 of FIG. 2 generates region proposals for the input data 501 using the relevant regions generated in operation 502. During operation 503, region proposals are generated within the relevant regions provided by the search space reduction operation 502 that may be subsequently classified as normal or anomalous. The region proposals generated in operation 503 are then provided as inputs to operation 504.

In operation 504, unsupervised anomaly classification is performed on the region proposals using the trained anomaly classification model 304 that was trained during the unsupervised training operation 303 of FIG. 3. The anomaly classification model 304 classifies the region proposals (i.e., the proposed regions) generated in operation 503 as normal or as anomalies using unsupervised anomaly classification in operation 504. In operation 504, the anomaly classification model 304 may, for example, assign a normal or an abnormal label to each region in an image that is evaluated from the region proposals received from model 203 in operation 503. As a specific example, anomaly classification model 304 can filter out background regions in images to identify regions of interest in the images that may be anomalous. Anomaly classification model 304 can also, for example, exclude the regions of interest from the images to determine if the input data 501 is healthy. The classifications of the region proposals as anomalous or normal are provided to contextual filtering operation 505 as inputs.

In contextual filtering operation 505, the trained filtering AI model 403 trained in operation 402 of FIG. 4 detects regions in the input data 501 (e.g., regions in images) that may appear anomalous to the anomaly classification model 304 in operation 504, but that are contextually normal. In operation 505, the trained filtering AI model 403 can, for example, determine if the classifications of the region proposals as anomalous or normal that were generated in operation 504 are correct. If the trained filtering AI model 403 determines that one or more of these classifications are incorrect, the trained filtering AI model 403 can re-classify one or more of the region proposals, e.g., as being normal instead of as an anomaly. The trained filtering AI model 403 can then output a prediction of the anomalous regions 506 after performing operation 505.

The technique that is used for search space reduction in operation 502 may be use-case and/or data dependent. For example, search space reduction can be implemented using pretrained artificial neural network architectures or image processing techniques. The search space reduction of operation 502 is optional and can be bypassed in the flow of FIG. 5. Although, the search space reduction of operation 502 can reduce the processing times of the subsequent operations 503-505. As an example, the search space reduction performed in operation 502 can receive an input image and crop a small area of interest in the input image that is further evaluated in the operations 503-505.

Figure 6:
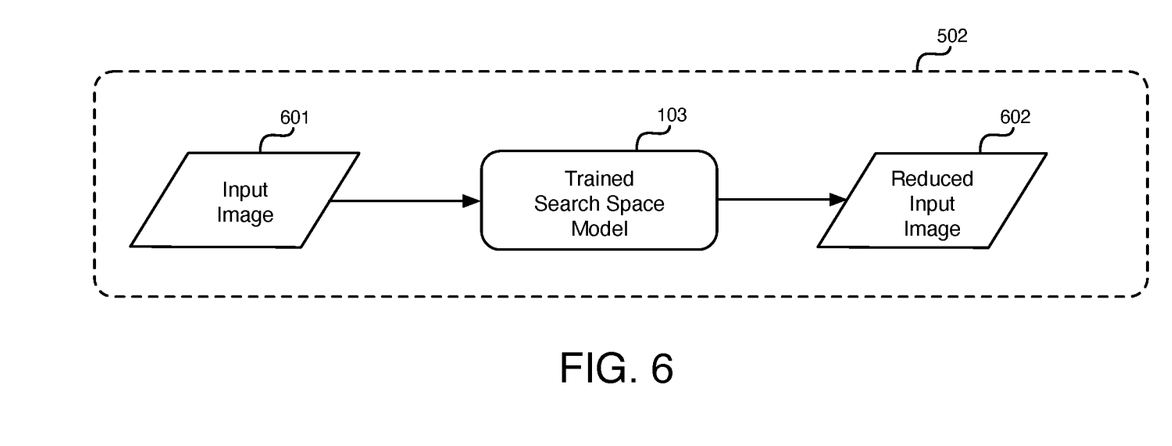
FIG. 6 is a diagram that illustrates an example of a trained search space model that performs search space reduction of an input image to generate a reduced image.

FIG. 6 is a diagram that illustrates an example of a trained search space model 103 that performs search space reduction of an input image to generate a reduced image during search space reduction operation 502. Input image 601 in FIG. 6 is an example of input data 501. In FIG. 6, the trained search space model 103 generated in operation 102 of FIG. 1 performs search space reduction (in operation 502) on an input image 601 to generate a reduced input image 602. The trained search space model 103 can, for example, crop an area of interest in the input image 601 to generate the reduced input image 602. The reduced input image 602 is then provided to operations 503-505 for additional processing, as disclosed herein with respect to FIG. 5.

The region proposals are generated either with attention maps or image processing techniques (i.e., thresholds or sliding windows/tiling). The region proposal plus classification pipeline functions in a similar fashion as traditional supervised two-stage object detection approaches, but with unlabeled data (i.e., unsupervised learning). For example, the region proposals can be generated in operation 503 using, for example, either attention maps obtained through self-supervised learning or image processing approaches, such as segmentation or thresholding. The resulting region proposals can be tiled to match the anomaly classifier input requirements allowing the evaluation of high-resolution images.

Figure 7:
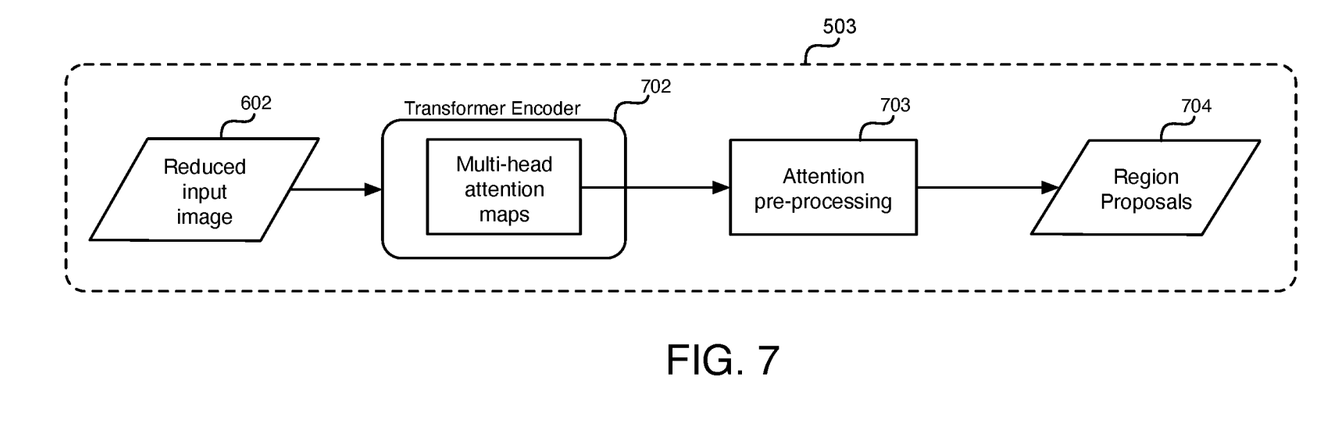
FIG. 7 is a diagram that illustrates examples of operations that can be performed during the region proposal operation of FIG. 5.

FIG. 7 is a diagram that illustrates examples of operations that can be performed during the region proposal operation 503 of FIG. 5. In FIG. 7, a transformer encoder model 702 performs a process on the reduced input image 602 (i.e., feeds forward the input image 602) generated by the trained search space model 103 in FIG. 6 using multi-head attention maps to generate regions of interest. The regions of interest are then used during an attention pre-processing operation 703 to generate the region proposals 704 in the reduced input image 602. The transformer encoder model 702 is the same as the trained region proposal model 203.

Figure 8:
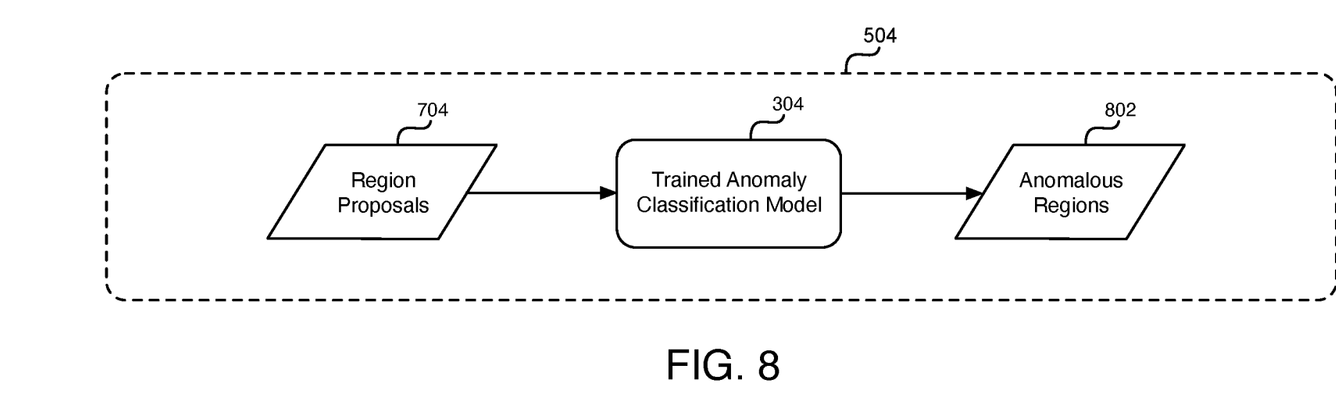
FIG. 8 is a diagram illustrating an example of a trained anomaly classification model identifying anomalous regions in region proposals during the unsupervised anomaly classification operation of FIG. 5.

FIG. 8 is a diagram illustrating an example of the trained anomaly classification model 304 identifying anomalous regions 802 in the region proposals 704 during the unsupervised anomaly classification operation 504 of FIG. 5. During inference, the anomaly classification model 304 (in operation 504) outputs a category label for each proposed region in the region proposals 704 that is computed by thresholding an anomaly score when using a student-teacher model, generative approaches, or directly from image clustering approaches. The regions 802 that the model 304 classifies as anomalies can be mapped back to the input image to define localization.

Some data sets may contain contextually non-interesting regions that may be modelled as anomalous, for example, due their low frequency of appearance in the data set. Supervised object detection approaches can be used to discard such regions if labeled data is available. FIG. 9 is a diagram illustrating examples of operations for generating filtered anomalous regions in input data by computing overlaps between normal regions and anomalous regions in the input data. The operations of FIG. 9 are part of the contextual filtering operation 505 of FIG. 5. FIG. 9 shows that the trained anomaly classification model 304 identifies normal regions 901 in the region proposals using input data 501 in contextual filtering operation 505, as discussed above with respect to FIG. 5. The normal regions 901 may, for example, contain non-anomalous objects in images. The trained anomaly classification model 304 also generates anomalous regions 802, as discussed above with respect to FIG. 8. In operation 902, the normal regions 901 are used to filter the anomalous regions 802 to generate filtered anomalous regions 903 by computing overlaps between bounding boxes in the normal regions 901 and in the anomalous regions 802. Operation 902 is also part of contextual filtering operation 505.

Figure 10:
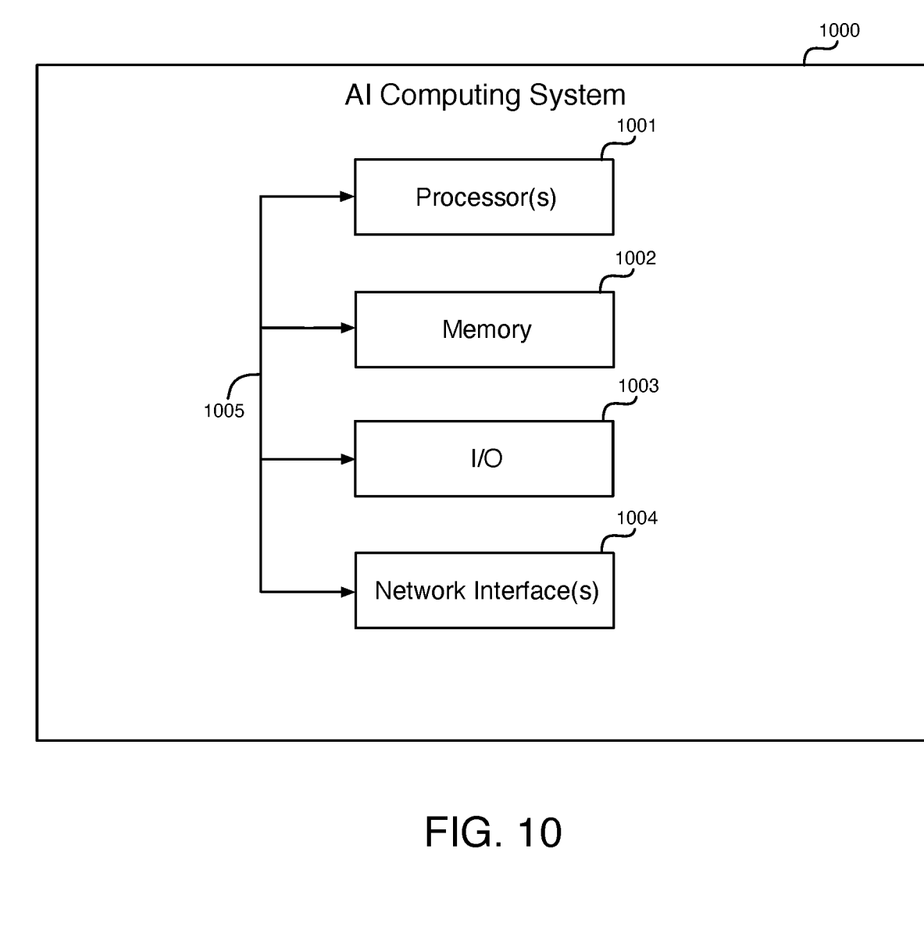
FIG. 10 illustrates an artificial intelligence (AI) computing system that can implement various embodiments disclosed herein, for example, with respect to any one or more of FIGS. 1-9.

FIG. 10 illustrates an artificial intelligence (AI) computing system 1000 that can implement various embodiments disclosed herein, for example, with respect to any of FIGS. 1-9. AI computing system 1000 includes one or more processor circuits 1001, memory 1002 that includes one or more memory circuits or memory devices, one or more input/output (I/O) devices 1003, one or more network interface devices 1004, and one or more busses 1005. The one or more processor circuits 1001 may execute program instructions, and the memory 1002 may store the program instructions. The program instructions may include one or more AI models. AI system 1000 may be housed in one computing device or in multiple computing devices. AI system 1000 may, for example, be in one or more server computers. AI system 1000 may, for example, be a distributed computing environment that has several computers communicating with each other. Two or more of the computers in the distributed computing environment may, for example, be located at a single location (e.g., a data center) and in communication with each other through one or more local area networks. Two or more of the computers in the distributed computing environment may be in multiple locations (e.g., multiple data centers) that are in communication with each other through a wide area network.

The one or more processor circuits 1001 may include one or more microprocessors or central processing units (CPUs) in one or more integrated circuits (ICs), programmable logic devices in ICs, graphics processing units (GPUs) in ICs, field programmable gate arrays (FPGAs) in ICs, or application specific integrated circuits (ASICs). Processor circuits 1001 may, for example, include an array of GPUs. The memory 1002 may include any type of memory technology including, for example, random access memory (RAM) storage, read only memory (ROM) storage, non-volatile memory such as flash storage, magnetic disc storage, magnetic tape storage, etc. The one or more I/O devices 1003 may include any types of devices configured to provide output to a user or to receive input from a user, such as a video monitor or display, a keyboard, a keypad, a mouse, a touch pad or panel, a pointing device, a microphone, a speaker, a camera, a scanner, or a printer. The one or more network interfaces 1004 may include any devices capable of communicating with one or more computer networks, for example, switches, bridges, routers, modems, transceivers, hubs, cellphones, etc. Processor circuits 1001, memory 1002, I/O devices 1003, and network interfaces 1004 communicate with each other through one or more busses 1005. In some embodiments, AI system 1000 also includes other devices and components that are not shown in FIG. 10.

AI system 1000 can implement the various embodiments disclosed herein with respect to FIGS. 1-9. For example, AI system 1000 can run any of operation 102 of FIG. 1, operation 202 of FIG. 2, model 203 and operations 302-303 of FIG. 3, operation 402 of FIG. 4, operations 502-505 of FIG. 5, model 103 of FIG. 6, operations 702-703 of FIG. 7, model 304 of FIG. 8, and operation 902 of FIG. 9.

In general, software, including any of the AI models disclosed herein, and data may be stored in non-transitory computer-readable storage media (e.g., tangible computer readable storage media). Non-transitory computer-readable storage media is tangible computer-readable storage media that stores data for access at a later time, as opposed to media that only transmits propagating electrical signals, such as wires. Software may sometimes be referred to as program instructions, instructions, or code. The non-transitory computer-readable storage media may include voltage memory circuits, non-volatile memory circuits, one or more hard drives (e.g., magnetic drives or solid state drives), one or more removable flash drives or other removable media, compact discs (CDs), digital versatile discs (DVDs), Blu-ray discs (BDs), other optical media, floppy disks, tapes, or any other suitable memory or storage device(s).

Additional examples are now described. Example 1 is a method for operating a computing system using at least one processor, the method comprising: generating region proposals in input data using a first trained artificial intelligence model; and performing unsupervised anomaly classification on the region proposals using a second trained artificial intelligence model to classify each of the region proposals as normal or as an anomaly.

In Example 2, the method of Example 1 further comprises: performing search space reduction on the input data using a third trained artificial intelligence model to generate relevant regions in the input data, wherein the first trained artificial intelligence model generates the region proposals in the relevant regions, and wherein the input data comprises images.

In Example 3, the method of any one of Examples 1-2 further comprises: performing contextual filtering on the region proposals classified as anomalies to determine if any of the region proposals classified as anomalies are contextually normal using a fourth trained artificial intelligence model.

In Example 4, the method of any one of Examples 2-3 further comprises: performing self-supervised training of a model by proposing a set of regions in unlabeled data to train the first trained artificial intelligence model; and applying a segmentation or detection artificial intelligence model to reduce the search space in labeled data by locating relevant regions in images in the labeled data used to train the third trained artificial intelligence model.

In Example 5, the method of any one of Examples 1-4 further comprises: selecting uninteresting or healthy regions from the region proposals using unlabeled data; and training the second trained artificial intelligence model for anomaly classification using the uninteresting or healthy regions with an unsupervised learning approach.

In Example 6, the method of Example 3 further comprises: utilizing supervised learning to train the fourth trained artificial intelligence model to perform object detection or image segmentation.

In Example 7, the method of Example 3 further comprises: providing a prediction of anomalous regions in the region proposals using the fourth trained artificial intelligence model after performing contextual filtering on the region proposals classified as anomalies.

In Example 8, the method of any one of Examples 2-7 can optionally include, wherein performing search space reduction on the input data further comprises performing search space reduction on an input image in the input data to generate a reduced input image that is part of the relevant regions.

In Example 9, the method of any one of Examples 2-8 can include, wherein generating the region proposals in the relevant regions further comprises comparing a reduced input image in the relevant regions to multi-head attention maps using a transformer encoder to generate regions of interest, and using the regions of interest to generate the region proposals.

In Example 10, the method of any one of Examples 1-9 further comprises: using normal regions generated by the second trained artificial intelligence model to filter anomalous regions generated by the second trained artificial intelligence model to generate filtered anomalous regions by computing overlaps between bounding boxes in the normal regions and in the anomalous regions.

Example 11 is a non-transitory computer-readable storage medium comprising instructions stored thereon that, when executed by one or more processors, cause the one or more processors to: generate region proposals in input data using a first trained artificial intelligence model; and perform unsupervised anomaly classification on the region proposals using a second trained artificial intelligence model to classify each of the region proposals as normal or as an anomaly.

In Example 12, the non-transitory computer-readable storage medium of Example 11 can include, wherein the instructions further cause the one or more processors to: perform search space reduction on the input data using a third trained artificial intelligence model to generate relevant regions in the input data, wherein the first trained artificial intelligence model generates the region proposals in the relevant regions; and perform contextual filtering on the region proposals classified as anomalies to determine if any of the region proposals classified as anomalies are contextually normal using a fourth trained artificial intelligence model.

In Example 13, the non-transitory computer-readable storage medium of Example 12 can include, wherein the instructions further cause the one or more processors to: provide a prediction of anomalous regions in the region proposals using the fourth trained artificial intelligence model after performing contextual filtering on the region proposals classified as anomalies.

In Example 14, the non-transitory computer-readable storage medium of any one of Examples 12-13 can include, wherein the instructions further cause the one or more processors to: perform the search space reduction on an input image in the input data to generate a reduced input image that is part of the relevant regions.

In Example 15, the non-transitory computer-readable storage medium of any one of Examples 11-14 can include, wherein the instructions further cause the one or more processors to: use normal regions generated by the second trained artificial intelligence model to filter anomalous regions generated by the second trained artificial intelligence model to generate filtered anomalous regions by computing overlaps between bounding boxes in the normal regions and in the anomalous regions.

Example 16 is a computer system comprising at least one processor device, wherein the computer system is configured to: generate region proposals in input data using a first trained artificial intelligence model; and perform unsupervised anomaly classification on the region proposals using a second trained artificial intelligence model to classify each of the region proposals as normal or as an anomaly.

In Example 17, the computer system of Example 16 can include, wherein the computer system is further configured to: perform search space reduction on the input data using a third trained artificial intelligence model to generate relevant regions in the input data, wherein the first trained artificial intelligence model generates the region proposals in the relevant regions; and perform contextual filtering on the region proposals classified as anomalies to determine if any of the region proposals classified as anomalies are contextually normal using a fourth trained artificial intelligence model.

In Example 18, the computer system of any one of Examples 16-17 can include, wherein the computer system is further configured to: select uninteresting or healthy regions from the region proposals using unlabeled data; and perform anomaly classification on the uninteresting or healthy regions during unsupervised training of an anomaly classification model to generate the second trained artificial intelligence model.

In Example 19, the computer system of any one of Examples 17-18 can include, wherein the computer system is further configured to: compare a reduced input image in the relevant regions to multi-head attention maps using a transformer encoder to generate regions of interest; and use the regions of interest to generate the region proposals.

In Example 20, the computer system of any one of Examples 16-19 can include, wherein the computer system is further configured to: use normal regions generated by the second trained artificial intelligence model to filter anomalous regions generated by the second trained artificial intelligence model to generate filtered anomalous regions by computing overlaps between bounding boxes in the normal regions and in the anomalous regions.

As will be recognized by one skilled in the art, the examples disclosed herein may be practiced without some or all of the specific details disclosed herein. In some instances, well-known operations have not been described in detail in order not to obscure the present embodiments. It should be appreciated that the embodiments disclosed herein can be implemented in numerous ways, such as a process, an apparatus, a system, a device, or a method on a computer readable medium.

The foregoing description of the exemplary embodiments of the present invention has been presented for the purpose of illustration. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. A method for operating a computing system on at least one processor, the method comprising:
    applying a segmentation or detection artificial intelligence model to reduce a search space in labeled data by locating first relevant regions in images in the labeled data used to train a first trained artificial intelligence model;
    performing search space reduction on input data using the first trained artificial intelligence model to generate second relevant regions in the input data;
    performing self-supervised training of a model by proposing a set of regions in first unlabeled data to train a second trained artificial intelligence model;
    generating region proposals in the input data using the second trained artificial intelligence model, wherein the second trained artificial intelligence model generates the region proposals in the second relevant regions; and
    performing unsupervised anomaly classification on the region proposals using a third trained artificial intelligence model to classify each of the region proposals as normal or as an anomaly.

2. The method of claim 1 further comprising:
    performing contextual filtering on the region proposals classified as anomalies to determine if any of the region proposals classified as anomalies are contextually normal using a fourth trained artificial intelligence model.

3. The method of claim 2 further comprising:
    providing a prediction of anomalous regions in the region proposals using the fourth trained artificial intelligence model after performing contextual filtering on the region proposals classified as anomalies.

4. The method of claim 1 further comprising:
    selecting uninteresting or healthy regions from the region proposals using second unlabeled data; and
    training the third trained artificial intelligence model for anomaly classification using the uninteresting or healthy regions with an unsupervised learning approach.

5. The method of claim 1, wherein performing search space reduction on the input data further comprises performing search space reduction on an input image in the input data to generate a reduced input image that is part of the second relevant regions.

6. The method of claim 1, wherein generating the region proposals further comprises comparing a reduced input image in the second relevant regions to multi-head attention maps using a transformer encoder to generate regions of interest, and using the regions of interest to generate the region proposals.

7. The method of claim 1 further comprising:
    using normal regions generated by the third trained artificial intelligence model to filter anomalous regions generated by the third trained artificial intelligence model to generate filtered anomalous regions by computing overlaps between bounding boxes in the normal regions and in the anomalous regions.

8. A method for operating a computing system on at least one processor, the method comprising:
    performing search space reduction on input data using a first trained artificial intelligence model to generate relevant regions in the input data;
    generating region proposals in the input data using a second trained artificial intelligence model, wherein the second trained artificial intelligence model generates the region proposals in the relevant regions;

performing unsupervised anomaly classification on the region proposals using a third trained artificial intelligence model to classify each of the region proposals as normal or as an anomaly;

utilizing supervised learning to train a fourth trained artificial intelligence model to perform object detection or image segmentation; and performing contextual filtering on the region proposals classified as anomalies to determine if any of the region proposals classified as anomalies are contextually normal using the fourth trained artificial intelligence model.

9. A non-transitory computer-readable storage medium comprising instructions stored thereon that, when executed by one or more processors, cause the one or more processors to:

generate region proposals in input data using a first trained artificial intelligence model;

perform unsupervised anomaly classification on the region proposals using a second trained artificial intelligence model to classify each of the region proposals as normal or as an anomaly; and use normal regions generated by the second trained artificial intelligence model to filter anomalous regions generated by the second trained artificial intelligence model to generate filtered anomalous regions by computing overlaps between bounding boxes in the normal regions and in the anomalous regions.

10. The non-transitory computer-readable storage medium of claim 9, wherein the instructions further cause the one or more processors to:

perform search space reduction on the input data using a third trained artificial intelligence model to generate relevant regions in the input data, wherein the first trained artificial intelligence model generates the region proposals in the relevant regions; and perform contextual filtering on the region proposals classified as anomalies to determine if any of the region proposals classified as anomalies are contextually normal using a fourth trained artificial intelligence model.

11. The non-transitory computer-readable storage medium of claim 10, wherein the instructions further cause the one or more processors to:

provide a prediction of the anomalous regions in the region proposals using the fourth trained artificial intelligence model after performing contextual filtering on the region proposals classified as anomalies.

12. The non-transitory computer-readable storage medium of claim 10, wherein the instructions further cause the one or more processors to:

perform the search space reduction on an input image in the input data to generate a reduced input image that is part of the relevant regions.

13. A computer system comprising at least one processor device, wherein the computer system is configured to:

perform search space reduction on input data using a first trained artificial intelligence model to generate relevant regions in the input data;

generate region proposals in the input data using a first second trained artificial intelligence model, wherein the second trained artificial intelligence model generates the region proposals in the relevant regions;

compare a reduced input image in the relevant regions to multi-head attention maps using a transformer encoder to generate regions of interest;

use the regions of interest to generate the region proposals; and perform unsupervised anomaly classification on the region proposals using a third trained artificial intelligence model to classify each of the region proposals as normal or as an anomaly.

14. The computer system of claim 13, wherein the computer system is further configured to:

perform contextual filtering on the region proposals classified as anomalies to determine if any of the region proposals classified as anomalies are contextually normal using a fourth trained artificial intelligence model.

15. The computer system of claim 13, wherein the computer system is further configured to:

select uninteresting or healthy regions from the region proposals using unlabeled data; and training the third trained artificial intelligence model for anomaly classification using the uninteresting or healthy regions with an unsupervised learning approach.

16. A computer system comprising at least one processor device, wherein the computer system is configured to:

generate region proposals in input data using a first trained artificial intelligence model;

perform unsupervised anomaly classification on the region proposals using a second trained artificial intelligence model to classify each of the region proposals as normal or as an anomaly; and use normal regions generated by the second trained artificial intelligence model to filter anomalous regions generated by the second trained artificial intelligence model to generate filtered anomalous regions by computing overlaps between bounding boxes in the normal regions and in the anomalous regions.

* * * * *